US012566813B2

(12) United States Patent
Yamada et al.

(10) Patent No.: US 12,566,813 B2
(45) Date of Patent: Mar. 3, 2026

(54) SYSTEMS AND METHODS FOR RENDERING INTERACTIVE WEB PAGES

(71) Applicants: Atlassian Pty Ltd., Sydney (AU); Atlassian US, Inc., San Francisco, CA (US)

(72) Inventors: Pedro Tacla Yamada, Sydney (AU); Benjamin De-Rong Nicholson, Sydney (AU); Raymond Rui Su, Sydney (AU)

(73) Assignees: ATLASSIAN PTY LTD., Sydney (AU); ATLASSIAN US, INC., San Francisco, CA (US)

( * ) Notice: Subject to any disclaimer, the term of this patent is extended or adjusted under 35 U.S.C. 154(b) by 0 days.

(21) Appl. No.: 18/525,525

(22) Filed: Nov. 30, 2023

(65) Prior Publication Data

US 2024/0095298 A1 Mar. 21, 2024

Related U.S. Application Data

(63) Continuation of application No. 17/542,210, filed on Dec. 3, 2021, now Pat. No. 11,836,212.

(51) Int. Cl.
| | |
|---|---|
| *G06F 16/958* | (2019.01) |
| *G06F 16/957* | (2019.01) |
| *G06F 40/117* | (2020.01) |

(52) U.S. Cl.
CPC ........ *G06F 16/972* (2019.01); *G06F 16/9577* (2019.01); *G06F 40/117* (2020.01)

(58) Field of Classification Search
CPC combination set(s) only.
See application file for complete search history.

(56) References Cited

U.S. PATENT DOCUMENTS

| | | | |
|---|---|---|---|
| 7,664,739 B2 * | 2/2010 | Farago | G06F 3/0485 |
| | | | 707/610 |
| 8,245,130 B1 | 8/2012 | Lloyd et al. | |
| 8,689,095 B2 | 4/2014 | Parish et al. | |

(Continued)

OTHER PUBLICATIONS

Grimstead, Ian J., Nick J. Avis, and David W. Walker. "Automatic distribution of rendering workloads in a grid enabled collaborative visualization environment." SC'04: Proceedings of the 2004 ACM/IEEE Conference on Supercomputing. IEEE, 2004 (Year: 2004).*

*Primary Examiner* — Shahid K Khan
(74) *Attorney, Agent, or Firm* — Brownstein Hyatt Farber Schreck, LLC

(57) ABSTRACT

Methods, systems and computer readable media for responding to webpage requests are disclosed. The method includes: receiving a request to render a webpage, the webpage comprising a plurality of webpage components; identifying at least a subset of webpage components of the plurality of webpage components to be rendered by the server; rendering the identified webpage components at the server and converting to HyperText Markup Language (HTML); and communicating the HTML of the webpage components rendered at the server along with unrendered web components of the plurality of webpage components to a client device for displaying on a display of the client device. The client device includes a client browser configured to render the unrendered webpage components and display all webpage components on the display of the client device.

20 Claims, 8 Drawing Sheets

100

(56) References Cited

U.S. PATENT DOCUMENTS

| | | | |
|---|---|---|---|
| 11,068,146 B2 | 7/2021 | Fitzgerald et al. | |
| 11,770,437 B1* | 9/2023 | Kallampally | G06Q 20/12 709/217 |
| 2004/0205528 A1 | 10/2004 | Alexander | |
| 2005/0192771 A1 | 9/2005 | Fischer | |
| 2006/0031849 A1 | 2/2006 | Barta et al. | |
| 2006/0150075 A1* | 7/2006 | Dietl | G06F 16/9577 715/205 |
| 2006/0230059 A1 | 10/2006 | Etgen et al. | |
| 2007/0282673 A1 | 12/2007 | Nagpal et al. | |
| 2008/0120343 A1 | 5/2008 | Altrichter et al. | |
| 2008/0222570 A1* | 9/2008 | MacLaurin | G06F 16/9577 715/839 |
| 2008/0244422 A1 | 10/2008 | Hilgers et al. | |
| 2009/0189894 A1 | 7/2009 | Petrov et al. | |
| 2009/0228782 A1 | 9/2009 | Fraser et al. | |
| 2009/0271012 A1 | 10/2009 | Kopka et al. | |
| 2010/0180192 A1* | 7/2010 | Hall | G06F 16/9577 715/234 |
| 2011/0055209 A1 | 3/2011 | Novac et al. | |
| 2011/0145315 A1* | 6/2011 | Walker | G06F 16/9577 709/203 |
| 2012/0110480 A1* | 5/2012 | Kravets | G06F 16/9577 715/760 |
| 2012/0246623 A1* | 9/2012 | Creel | G06F 11/3672 717/128 |
| 2013/0063488 A1 | 3/2013 | Gaebler et al. | |
| 2013/0268573 A1 | 10/2013 | Lee et al. | |
| 2014/0122999 A1* | 5/2014 | Falkenberg | G06F 9/451 715/234 |
| 2014/0129966 A1 | 5/2014 | Kolesnikov et al. | |
| 2015/0135067 A1 | 5/2015 | Ellis et al. | |
| 2015/0248451 A1 | 9/2015 | Walker et al. | |
| 2015/0251092 A1 | 9/2015 | Chu et al. | |
| 2015/0269128 A1 | 9/2015 | Hepper et al. | |
| 2016/0078005 A1* | 3/2016 | Soós | G06F 40/114 715/251 |
| 2018/0052943 A1 | 2/2018 | Hui et al. | |
| 2018/0203826 A1* | 7/2018 | Ansel | G06F 40/163 |
| 2018/0210714 A1* | 7/2018 | Grigoryan | G06F 8/41 |
| 2018/0285337 A1 | 10/2018 | Wagh et al. | |
| 2019/0220591 A1 | 7/2019 | Burriesci et al. | |
| 2019/0251143 A1 | 8/2019 | Dai et al. | |
| 2020/0125612 A1* | 4/2020 | Kennedy, Jr. | G06F 40/106 |
| 2022/0043546 A1 | 2/2022 | Glezeris et al. | |
| 2023/0161943 A1* | 5/2023 | Morariu | G06F 40/106 715/243 |

* cited by examiner

400

402 Receive board request

404 Retrieve board content

406 Determine no. of columns in board

408 Determine max. no. of cards to render per column

410 Select an unprocessed column

412 Mark up to max. no. of cards in column for rendering

414 More unprocessed columns?

Yes

No

416 Render marked cards

418 Transmit rendered HTML to client browser

600

602 Retrieve board content

604 Determine no. of columns in board

606 Determine max. no. of cards to render per column in first swimlane

608 Select an unprocessed swimlane

610 Mark up to max. no. of cards in column

611 More swimlanes?

Yes

612 Determine max. no. of cards to render per column in next swimlane

614 Max. no > 0?

Yes

No

No

616 Render marked cards and communicate HTML to client browser

800

Receive board request ⌐ 802

Retrieve board content ⌐ 804

Determine no. of columns in board ⌐ 806

Set render counter to zero ⌐ 808

Select a column ⌐ 810

812 — Unmarked cards? — No

Yes

Mark card for rendering

814

Increment render counter by 1

816

818 — Counter = threshold? — No → All cards marked? — No

820

Yes

Render marked cards and communicate rendered HTML to client browser ← Yes

822

SYSTEMS AND METHODS FOR RENDERING INTERACTIVE WEB PAGES

CROSS-REFERENCE TO RELATED APPLICATION(S)

This application is a continuation patent application of U.S. patent application Ser. No. 17/542,210, filed Dec. 3, 2021 and titled "Systems and Methods for Rendering Interactive Web Pages," the disclosure of which is hereby incorporated herein by reference in its entirety.

FIELD

The present disclosure relates generally to rendering structured documents (such as web pages) and, more particularly, to efficiently rendering structured documents using asynchronous techniques.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

To display a web page or application on a user device, a client browser typically sends a request for information to a website. The website in return serves structured documents to the browser, which processes these structured documents. When a web page or application includes one or more interactive elements or components, the browser also receives and downloads scripts for the interactive elements/components and processes these for display. In one use case, a server computer may load a JAVASCRIPT file, or dynamically generate JAVASCRIPT code, and transmit the code to a user device over a network. At the user device, the JAVASCRIPT code is automatically parsed and interpreted, causing the user device or the browser to perform useful work.

This type of rendering is often termed client-side rendering, where the browser requests a single HTML file and the server delivers it without any content (or with a loading screen) until the browser fetches the JAVASCRIPT code and compiles the code before rendering the content. Although client side rendering has some advantages it also suffers from some issues. For instance, as the browser has to make one or more requests to the server for the JAVASCRIPT scripts, and needs to install and execute the scripts, it may take a long time to load a webpage.

SUMMARY

In certain embodiments of the present disclosure a computer-implemented method for responding to webpage requests is disclosed. The method includes receiving a request to render a webpage, the webpage including a plurality of webpage components and identifying at least a subset of webpage components of the plurality of webpage components to be rendered by the server. The method further includes rendering the identified webpage components at the server and converting to HyperText Markup Language (HTML), and communicating the HTML of the webpage components rendered at the server along with unrendered web components of the plurality of webpage components to a client device for displaying on a display of the client device. The client device includes a client browser configured to render the unrendered webpage components and display the webpage components on a display of the client device.

In certain other embodiments of the present disclosure a non-transitory computer readable medium is disclosed. The non-transitory computer readable medium includes instructions, which when executed by a processor of a computing device, cause the computing device to: receive a request to render a webpage, the webpage comprising a plurality of webpage components and identify at least a subset of webpage components of the plurality of webpage components to be rendered by a server. The computer-readable medium further includes instructions which cause the computing device to render the identified webpage components at the server and convert to HyperText Markup Language (HTML) and communicate the HTML of the webpage components rendered at the server along with unrendered web components of the plurality of webpage components to a client device for displaying on a display of the client device. The client device includes a client browser configured to render the unrendered webpage components and display the webpage components on a display of the client device.

Figure 1:
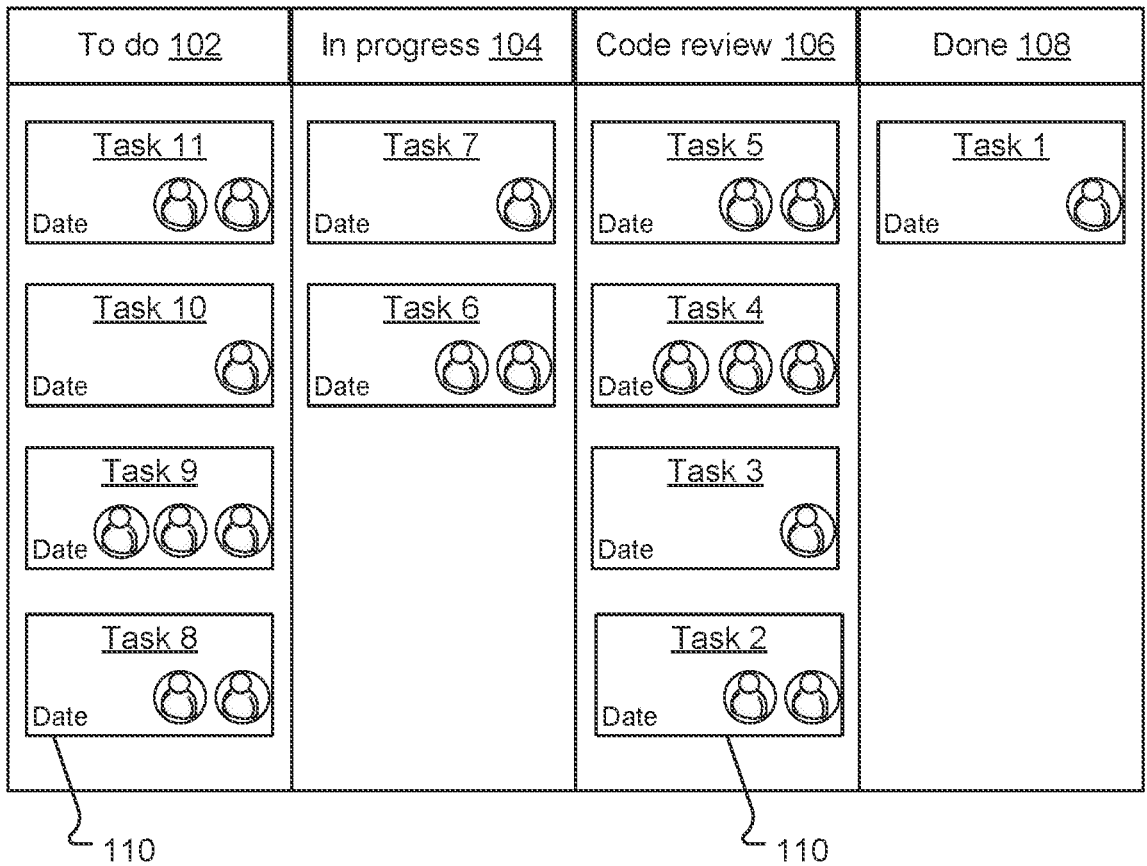
FIG. 1 is an example webpage board rendered by a client system.

While the present disclosure is amenable to various modifications and alternative forms, specific embodiments are shown by way of example in the drawings and are described in detail. It should be understood, however, that the drawings and detailed description are not intended to limit the embodiments to the particular form disclosed. The intention is to cover all modifications, equivalents, and alternatives falling within the spirit and scope of the present disclosure as defined by the dependent claims.

DETAILED DESCRIPTION

In the following description, for the purposes of explanation, numerous specific details are set forth in order to provide a thorough understanding of the present invention. It will be apparent, however, that the embodiments described in the present disclosure may be practiced without these specific details. In some instances, well-known structures and devices are shown in block diagram form in order to avoid unnecessary obscuring.

Overview

Typically, when a user selects a web page, a web browser executing on the user's device sends a request to a server to fetch an HTML document for the web page. In response to this request, the server returns HTML text. Typically, the HTML includes the actual content and structure for the web page along with the style elements such as cascading style sheet (CSS) elements that specify the styling of the web page (including background color, layout, font, etc.). In addition, if the web page is interactive or dynamic, the HTML may include one or more components (such as JAVASCRIPT functions). Components can be used to split the user interface into independent, reusable pieces that can be interacted with in isolation. Examples of components include search boxes on web pages, additional information windows that appear when an affordance is selected or a pointer hovers over the affordance, dynamic data cards for boards, video feeds embedded in a page, etc.

When the browser reads the received HTML document, it parses the document and converts each HTML element encountered in the document into a node. Eventually, all HTML elements within the document are converted to nodes. After the browser has created nodes it creates a tree-like structure of these node objects, which is called a document object model (DOM) tree. A DOM tree starts from the topmost element which is an 'html' element and branches out as per the occurrence and nesting of HTML elements in the document.

After constructing the DOM, the browser reads style information from all sources (e.g., external, embedded, inline, user-agent, etc.) and constructs a tree like styling structure called a CSS object model (CSSOM). Each node in this tree contains CSS style information that will be applied to DOM elements that it targets. The browser also creates a render tree, which is a tree-like structure constructed by combining DOM and CSSOM trees together. The render tree is used to calculate the layout of each visible element and paint them on the screen.

The browser first creates the layout of each individual render tree node. The layout consists of the size of each node in pixels and where (position) it will be printed on the screen. This process is called layout since the browser is calculating the layout information of each node.

Since elements in the render tree can overlap each other and they can have CSS properties that make them frequently change the look, position, or geometry (such as animations), the browser creates layers. Creating layers helps the browser efficiently perform painting operations throughout the lifecycle of a web page such as while scrolling or resizing the browser window. Having layers also helps the browser correctly draw elements in the stacking order (along the z-axis) as they were intended by the developer. Inside each layer, the browser fills the individual pixels for whatever visible property the element has such as border, background color, shadow, text, etc. This process is called rasterization. To increase performance, the browser may use different threads to perform rasterization.

The sequence of operations from creating the DOM to painting pixels on the screen is called a critical rendering path and to improve user experience, developers constantly try to reduce the time taken in the critical rendering path. This may include reducing the time to first contentful paint

4

(FCP) (i.e., time taken by the browser to first render any text, image, non-white canvas on the screen), reducing the time to first meaningful paint (FMP) (i.e., time taken by the browser to fully load viewable content on the screen) and reducing the time to interaction (TTI) (i.e., time taken for the webpage to be usable and respond to user input).

In some cases, to reduce FCP and FMP, server side rendering (SSR) may be used. In particular, instead of parsing and interpreting script code at the client, this can be done at the server. The term "server-side rendering" may be used to refer to an execution of the script code by the server computer, which results in rendering HTML code in some cases, for transmission to a client browser. However, some implementations of server-side rendering have potential issues or drawbacks.

For example, in server side rendering, if any computational operations need to be performed (e.g., to render cards for a board, to render a table or spreadsheet, or to retrieve dynamic data), these operations can be performed on the server (which often has more powerful computation means than the client device) and the server can then deliver the content to the client as pre-computed HTML. This way, the client has to simply render the HTML and not run as many complex, memory-intensive JAVASCRIPT functions as those functions are no longer required to complete the FCP.

However, as described above, server side rendering may not always reduce FCP or TTI. Often, developers add timeouts to their server side rendering processes. The timeout sets a time limit within which the server should execute components of a webpage and return these to the client browser as HTML. If the server fails to execute all the functions within this time limit—e.g., because of an error in rendering or because there are too many components to execute—whatever is rendered by the server is flushed and the entire rendering operation is pushed to the client. That is, the JAVASCRIPT/webpage components are communicated to the client browser for client side rendering.

It will be appreciated that such timeouts are undesirable and if they occur, the entire server rendering time (e.g., 2-3 seconds) is wasted, whatever was rendered on the server is discarded, and the process is restarted at the client browser. As can be appreciated, this also adversely affects the time taken to FCP and FMP. In particular, by wasting the server rendering time and pushing the JAVASCRIPT rendering to the client after a timeout, the FMP may occur at the same time as the TTI (i.e., a few seconds after the web page is opened). This can cause a bad viewing experience for the user.

Such rendering timeouts may rarely occur for smaller webpages that have a few components to execute and render. However, chances of timeouts increase for webpages that have higher number of components. One example of such a webpage is a board (e.g., such as that offered by Trello or Jira). A board (also interchangeably referred to as a virtual board herein) typically includes multiple columns and each column may include one or more objects or cards that include dynamic data. Each object/card in a board may be a component (or JAVASCRIPT function) that needs to be retrieved, executed, and rendered as HTML. If a board includes a large number of such cards—e.g., hundreds of cards, chances of server side rendering timeouts increase.

In some cases, for larger webpages, e.g., boards with over 250 cards, extremely high server side rendering timeout percentage (approaching 100%) may be observed.

Embodiments of the present disclosure reduce the FCP and FMP for such webpages by truncating server side rendering. In particular, aspects of the present disclosure stop server side rendering once a threshold number of components are rendered by the server. If a webpage includes fewer components than the threshold number of components the server can render, the webpage rendering may be performed completely on the server. By way of a non-limiting example, if the number of components in a webpage exceeds the threshold number of components that the server can render, the server may stop rendering when the threshold number is reached. In this case, instead of flushing out the HTML that has been rendered up until that point, the server may communicate the rendered HTML to the client browser. The client browser may then request the server to provide the unrendered webpage components to the client browser for client side rendering.

Accordingly, aspects of the present disclosure employ both server side and client side rendering. This way, the speed and efficiency of the server can be utilized to quickly render at least some components and push these to the client browser for displaying on the screen. The remaining components can be executed by the client browser and rendered after FMP.

In some examples, the threshold number of components that can be rendered by the server is selected such that components that form part of the user interface that is initially seen on the device screen are rendered by the server. Components that become visible after a scrolling action may be rendered by the client. This way, the client device can quickly render an initial meaningful user interface on the client device and reduce time to FMP. In such examples, the threshold number may be dynamically selected, e.g., based on the screen size of the user device. In other examples, the threshold number is predetermined, e.g., based on the most common screen size on which a given webpage is viewed. In any event, the threshold is selected such that the time taken by the server to render the components is lesser than the rendering timeout of the server system.

Aspects of the present disclosure will be described with respect to webpages generated by object tracking applications that provide mechanisms for creating objects, object states, and transitioning objects between states. However, it will be appreciated that this is just an example and that aspects of the present disclosure can be implemented for other types of webpages that include JAVASCRIPT components just as easily without departing from the scope of the present disclosure.

One example of an object tracking application (as referred to in the present context) is Trello. Trello allows users to create objects in the form of cards and object states in the form of lists. In order to change a card state in Trello, a card is moved from one list to another. For example, a Trello user may set up a board (a list of lists) having the lists "To Do", "In Progress", and "Completed". A user may then create cards in respect of a particular task that needs to be done and add them to the "To Do" list: e.g. a "grocery shopping" card, a "washing up" card, an "organize house party" card, etc. The user can also transition cards between lists, e.g., by dragging or other means, from its current list to another one. For example, once the user has completed grocery shopping they can drag the corresponding card from the "To Do" list to the "Completed" list. If the user has started but not yet completed work on their house party task they can drag the corresponding card from the "To Do" list to the "In Progress" list.

A further example of what the present disclosure refers to as an object tracking application is Jira. Jira allows users to create objects in various forms—for example issues or, more generally, work items. A work item in Jira is an object with associated information and an associated workflow—i.e., a series of states through which the work item transitions over its lifecycle. Any desired workflow may be defined for a given type of work item. Different workflows with different states and/or transitions between states can be appropriate for different implementations.

By way of a non-limiting example, Jira can be configured to track software development projects. In this case, a given work item can have (and transition between) the states of: to do (e.g., work that has not yet been started); in progress (e.g., work that is currently being done); code review (e.g., work that has been competed but requires review before being deployed); and done (work that is completely finished).

Object tracking applications such as those described above often provide user interfaces for displaying the current state of objects maintained by the application and allowing users to move objects (e.g. cards in Trello, work items in Jira) between states. In both Trello and Jira such user interfaces are referred to as boards. FIG. 1 provides an example board 100 which shows a workflow to track software development projects. In particular, the board 100 includes four columns, each corresponding to a workflow state: TO DO 102; IN PROGRESS 104; CODE REVIEW 106; and DONE 108. Board 100 also includes several visual representations of objects/cards (tasks in the present context) 110, each of which is in a particular column according to the current state of the object. Each object/card may include a task title and description, a date by which the task is to be completed or was completed and one or more user assigned to complete the task.

Aspects of the present disclosure will be described with respect to rendering of such objects/cards 110 in boards 100, where each object/card 110 in the board 100 is a component. Data for the object/card is retrieved by executing the component (also known as a JAVASCRIPT function).

Example Systems

Figure 2:
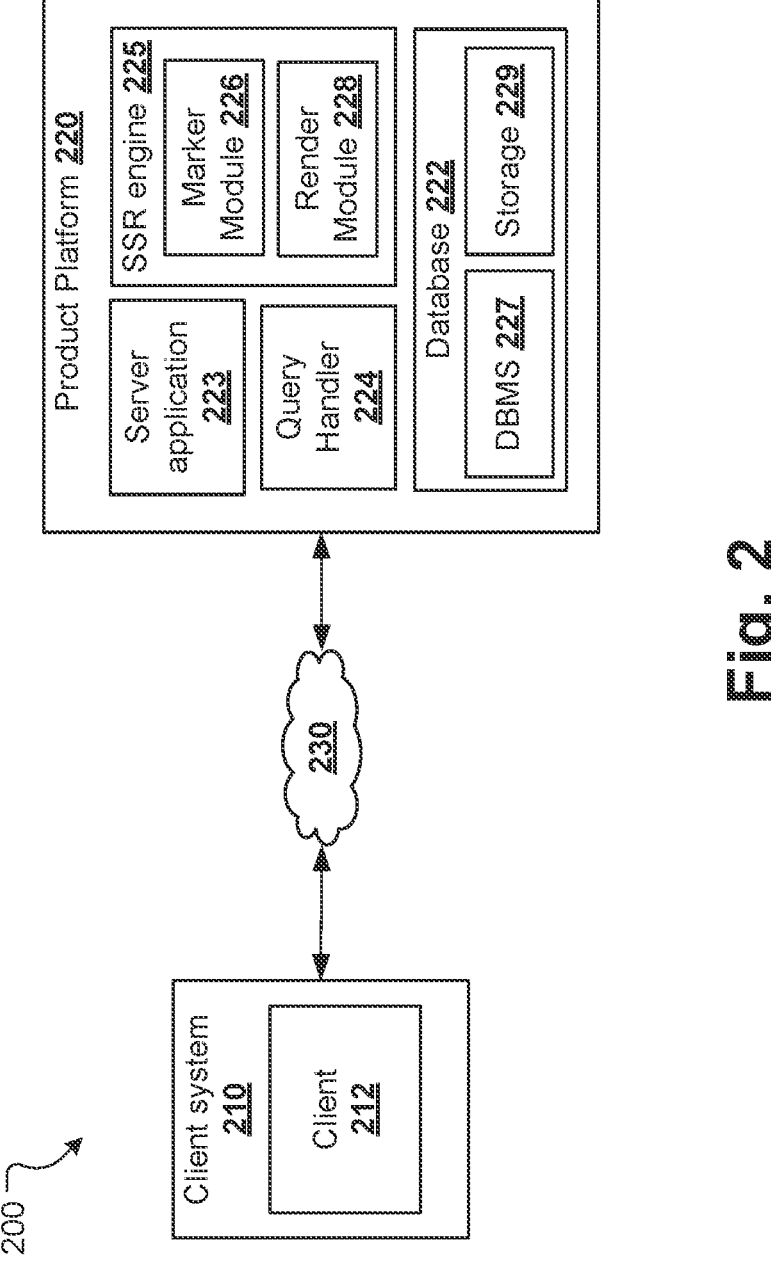
FIG. 2 is a block diagram of a networked environment according to some embodiments of the present disclosure.

FIG. 2 illustrates an environment 200 in which one or more aspects of the present disclosure are implemented. Specifically, FIG. 2 illustrates the various systems involved in rendering web pages on client devices according to embodiments of the present disclosure. The systems include client system 210 and a product platform 220 such as an object tracking system. The client system 210 and product platform 220 communicate with each other over one or more communication networks 230.

The product platform 220 may be a system or set of systems configured to provide any type of service/perform any type of operations for clients. In order to provide such services/operations, product platform 220 stores data in a database 222. As one example, product platform 220 may be an object tracking system used (inter alia) to create, manage, and track objects. Product platform 220 may, however, provide other services/perform other operations.

In the present example, product platform 220 includes a server application 223, a query handler 224, and a server side rendering (SSR) engine 225.

Server application 223 is executed by a computer processing system to configure that system to provide server-side functionality to one or more corresponding client applications (e.g., client application 212 as discussed below). Server application 223 comprises one or more application programs, libraries, APIs or other software elements that implement the features and functions that are described herein. For example, where the client application 212 is a web browser, the server application 223 is a web server such as Apache, IIS, nginx, GWS, or an alternative web server. Where the client application 212 is a specific/native application, server application 214 is an application server configured specifically to interact with that client application 212.

In some embodiments, the server application 223 may be provided with both web server and application server applications.

Database 222 includes one or more database management systems (DBMS) 227 and one or more data storage systems 229 (operating on one or multiple computer processing systems). Generally speaking, DBMS 227 receives structured query language (SQL) queries from a given application (e.g., server application 223 or SSR engine 225), interacts with data storage system 229 to read/write data as required by those queries, and responds to the relevant application with results of the query.

Database 222 may store any data relevant to the services provided/operations performed by the server application 223. In the present examples, such data includes data objects (or, in some cases, objects for short). In this context, a data object is a logical grouping of data. Data for a data object may be stored across multiple database records (e.g., across multiple database tables) that are related to one another by one or more database keys (for example object identifiers and/or other identifiers).

By way of a non-limiting example, where product platform 220 is an object tracking system, data objects may be related to issues that are maintained and managed by the system. In this case, various data can be maintained in respect of a given issue, for example: an issue identifier; an issue state; a team or individual to which the issue has been assigned; an issue description; an issue severity; a service level agreement associated with the issue; a tenant to which the issue relates; an identifier of a creator of the issue; a project to which the issue relates; identifiers of one or more issues that the issue is dependent on; identifiers of one or more issues that depend on the issue; identifiers of one or more other stakeholders; and/or other data.

The query handler 224 is configured to receive a web page request from a client system 210 and respond to that web page request with data defining the structure (e.g., styling information), content (e.g., the actual data to be displayed on the web page), and behavior (e.g., interactive components) of the web page. To do this, the query handler 224 is configured to identify the requested web page, the requesting client system 210 and in some examples a user identifier of the user making the request. It is also configured to retrieve web page data for the requested web page, determine which routes need to be rendered and communicates this to the SSR server. It also receives rendered HTML data from the SSR engine 225 and sends this to the client.

The SSR engine 225 is configured to receive web page data including components from the query handler 224, convert the components into static HTML and communicate the HTML back to the query handler 224 for communicating to the client system 210. In some examples, the SSR engine 225 renders a threshold number of components of the web page into HTML and communicates the HTML to the query handler 224. The client system 210 may request the server application 223 to provide the unrendered components of the webpage to be rendered on the client system 210.

In order to do this, the SSR engine 225 includes a marker module 226 that is configured to identify and mark the components/cards that are to be rendered by the server and a render module 228 that is configured to render the marked components/cards.

In some cases, instead of waiting for the threshold number of components to be executed and the corresponding data to be converted to HTML (which may take a considerable amount of time and delay FMP), the SSR engine 225 may be configured to stream HTML data to the query handler 224 as and when it is converted. This way, the query handler 224 can stream the HTML data to the client system 210, which can immediately start creating its DOM, CSSOM, and render trees and render some content on a display of the client system 210 quickly.

In some embodiments, the SSR engine 225 may have a distributed computing architecture comprising a load balancer and two or more computing instances, Each of the computing instances may include any of a CPU, multi-core processor, server computer, programmatic container, virtual computing instance or public cloud computing instances. The specific hardware, virtualization arrangement or operating system software of computing instances is not critical. The load balancer is programmed to receive rendering requests from the query handler 224 and distribute these rendering requests to a selected one of the computing instances.

Each of the computing instances may host or executes a main process and a plurality of worker processes; there may be any number of worker processes. Each main process is programmed to receive rendering requests arriving from the query handler 224 via the load balancer and distribute the requests to one of the worker processes based on load or other factors. In some embodiments, a round-robin process may be used to distribute work to worker processes, or active monitoring may be used to detect which worker process(es) is/are free and to distribute a request to one of the free processes. Alternatively or additionally, each worker process may be instantiated using a separate compute node and assigned client requests with or without load monitoring.

In operation, a request to execute a JAVASCRIPT component arrives at a worker thread. In response, the worker thread is programmed to select and use, or acquire, a runtime instance from a pool of runtime instances. The worker thread then executes the JAVASCRIPT component. This execution may result in writing, confidential data values to one or more variables, data items or other memory locations having global scope, in main memory. Upon completing execution of the JAVASCRIPT component, the worker thread dispatches a response to the main process, which in turn dispatches the response to the query handler 224. Thereafter, the worker thread can perform cleanup operations and return the runtime instance to the runtime pool. Cleanup, in this context, may comprise deleting the variables, data items or other memory locations having global scope. Therefore, on a subsequent execution of the same runtime instance for another client request, the variables, data items or other memory locations having global scope will not retain any data that was created to process a prior specific client request.

Alternatively or additionally, after completion of executing a particular runtime, that runtime may be deleted. Deletion may comprise deallocating memory associated with the runtime or using a memory delete operation to write default or random values to all addresses in the address space previously used by the particular runtime. Asynchronously a runtime factory may instantiate a new runtime instance and add the new runtime instance to the runtime pool.

In certain embodiments, product platform 220 is a multi-tenanted system: i.e., server application 223 serves multiple tenants. In these embodiments, any request received by the product platform 220 is associated with a particular tenant— e.g., via a tenant identifier. For example, a given request may be received from/initiated by a particular account, and the identifier for that account will be associated with a tenant identifier.

The applications executed by product platform 220 typically run on multiple computer processing systems. For example, in some implementations each component of the product platform 220 may be executed on a separate computer processing system. In other embodiments, multiple (or even all) components of the product platform 220 may run on a single computer processing system. In certain cases a clustered server architecture may be used where applications are executed across multiple computing instances (or nodes) that are commissioned/decommissioned on one or more computer processing systems to meet system demand.

Client system 210 hosts a client application 212 which, when executed by the client system 210, configures the client system 210 to provide client-side functionality. This may include, for example, interacting with (i.e., sending data to and receiving data from) server application 223. Such interactions typically involve logging on (or otherwise accessing) server application 223 by providing credentials for a valid account maintained by the product platform 220. As noted above, in certain embodiments the account may be associated with a particular tenant identifier. Once validated, a user can perform various functions using client application 212, for example requesting web pages, generating requests to read data from or write data to database 222, automating such requests (e.g., setting requests to periodically execute at certain times), and other functions.

Client application 212 may be a general web browser application (such as Chrome, Safari, Internet Explorer, Opera, or an alternative web browser application) which accesses a server application such as server application 223 via an appropriate uniform resource locator (URL) and communicates with the server application via general world-wide-web protocols (e.g., HTTP, HTTPS, FTP). When the client application 212 is a web browser, its main function is to present web resources requested by the user. Further, a given client system 210 may have more than one client application 212, for example, it may have two or more types of web browsers.

A web browser has seven main components (not shown)—a user interface, a browser engine, a rendering engine, networking module, user interface backend, JavaScript interpreter, and data storage. The user interface includes parts of the browser display, such as the address bar (where a user can enter a URL of the webpage the user wishes to view), back/forward buttons, etc. The browser engine organizes actions between the UI and the rendering engine and the rendering engine is responsible for displaying the requested content. When a web page is requested, the rendering engine analyses the received HTML and CSS files and renders the analyzed content on the screen (using the processes described earlier). The user interface backend is used to draw or paint basis widgets like combo boxes and windows and the JavaScript Interpreter is used to parse and execute any JavaScript code received from the product platform 220. The data storage is a persistence layer where the browser saves data locally, such as cookies.

Client system 210 may be any computer processing system which is configured (or configurable) by hardware and/or software to offer client-side functionality. By way of example, suitable client systems may include: server computer systems, desktop computers, laptop computers, netbook computers, tablet computing devices, mobile/smart phones, and/or other computer processing systems.

The client system 210 and product platform 220 (or applications of the product platform 220) communicate data between each other either directly or indirectly through one or more communications networks 230. Communications network 230 may comprise a local area network (LAN), a public network, or a combination of networks.

The embodiments and features of the present disclosure are implemented using one or more computer processing systems. For example, client system 210 is a computer processing system and product platform 220 includes various applications and components that are provided by one or more computer processing systems.

Figure 3:
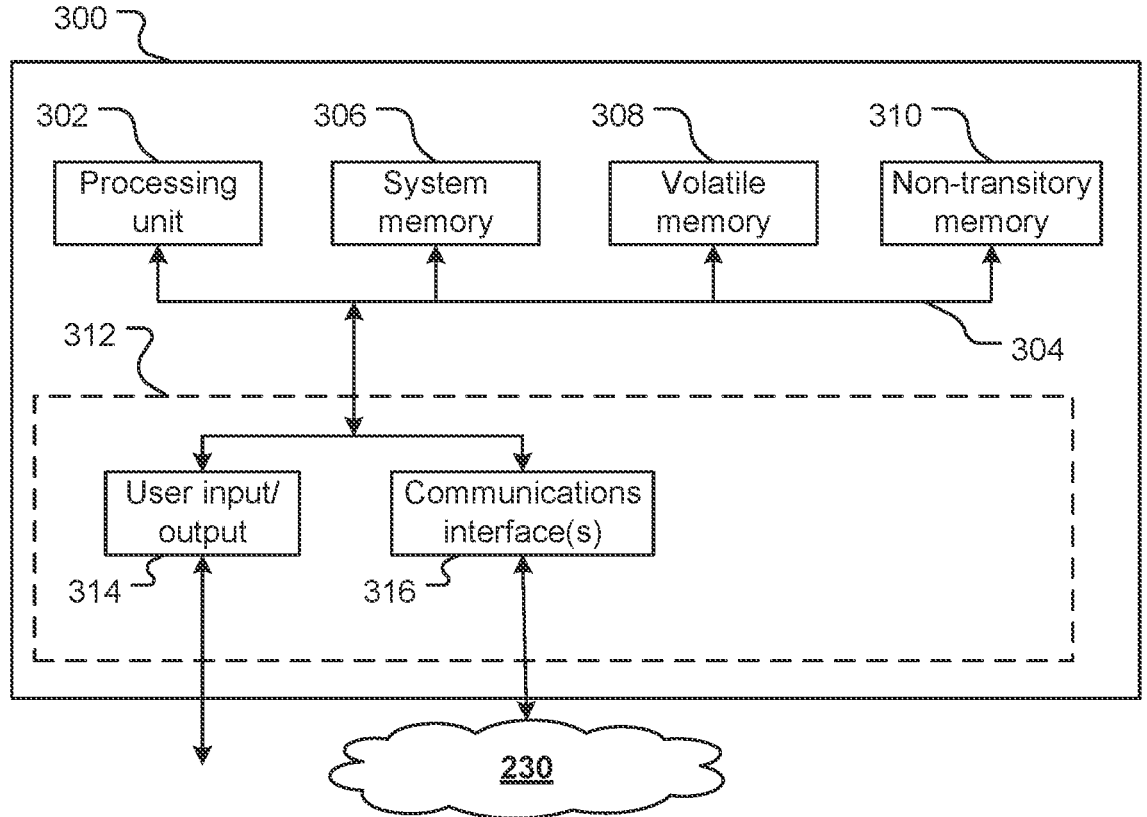
FIG. 3 is a block diagram of a computing system with which various embodiments of the present disclosure may be implemented.

FIG. 3 provides a block diagram of a computer processing system 300 configurable to implement embodiments and/or features described herein. System 300 is a general purpose computer processing system. It will be appreciated that FIG. 3 does not illustrate all functional or physical components of a computer processing system. For example, no power supply or power supply interface has been depicted, however system 300 will either carry a power supply or be configured for connection to a power supply (or both). It will also be appreciated that the particular type of computer processing system will determine the appropriate hardware and architecture, and alternative computer processing systems suitable for implementing features of the present disclosure may have additional, alternative, or fewer components than those depicted.

Computer processing system 300 includes at least one processing unit 302—for example a general or central processing unit, a graphics processing unit, or an alternative computational device). Computer processing system 300 may include a plurality of computer processing units. In some instances, where a computer processing system 300 is described as performing an operation or function all processing required to perform that operation or function will be performed by processing unit 302. In other instances, processing required to perform that operation or function may also be performed by remote processing devices accessible to and useable by (either in a shared or dedicated manner) system 300.

Through a communications bus 304, processing unit 302 is in data communication with a one or more computer readable storage devices which store instructions and/or data for controlling operation of the processing system 300. In this example system 300 includes a system memory 306 (e.g., a BIOS), volatile memory 308 (e.g., random access memory such as one or more DRAM applications), and non-volatile (or non-transitory) memory 310 (e.g., one or more hard disks, solid state drives, or other non-transitory computer readable media). Such memory devices may also be referred to as computer readable storage media (or a computer readable medium).

System 300 also includes one or more interfaces, indicated generally by 312, via which system 300 interfaces with various devices and/or networks. Generally speaking, other devices may be integral with system 300, or may be separate. Where a device is separate from system 300, connection between the device and system 300 may be via wired or wireless hardware and communication protocols, and may be a direct or an indirect (e.g., networked) connection.

Wired connection with other devices/networks may be by any appropriate standard or proprietary hardware and connectivity protocols, for example Universal Serial Bus (USB), eSATA, Thunderbolt, Ethernet, HDMI, and/or any other wired connection hardware/connectivity protocol.

Wireless connection with other devices/networks may similarly be by any appropriate standard or proprietary hardware and communications protocols, for example, infrared, BlueTooth, WiFi; near field communications (NFC); Global System for Mobile Communications (GSM), Enhanced Data GSM Environment (EDGE), long term evolution (LTE), code division multiple access (CDMA—and/or variants thereof), and/or any other wireless hardware/connectivity protocol.

Generally speaking, and depending on the particular system in question, devices to which system 300 connects—whether by wired or wireless means—include one or more input/output devices (indicated generally by input/output device interface 314). Input devices are used to input data into system 300 for processing by the processing unit 302. Output devices allow data to be output by system 300. Example input/output devices are described below, however it will be appreciated that not all computer processing systems will include all mentioned devices, and that additional and alternative devices to those mentioned may well be used.

For example, system 300 may include or connect to one or more input devices by which information/data is input into (received by) system 300. Such input devices may include keyboards, mice, trackpads (and/or other touch/contact sensing devices, including touch screen displays), microphones, accelerometers, proximity sensors, GPS devices, touch sensors, and/or other input devices. System 300 may also include or connect to one or more output devices controlled by system 300 to output information. Such output devices may include devices such as displays (e.g., cathode ray tube displays, liquid crystal displays, light emitting diode displays, plasma displays, touch screen displays), speakers, vibration applications, light emitting diodes/other lights, and other output devices. System 300 may also include or connect to devices which may act as both input and output devices, for example, memory devices/computer readable media (e.g., hard drives, solid state drives, disk drives, compact flash cards, SD cards, and other memory/computer readable media devices) which system 300 can read data from and/or write data to, and touch screen displays which can both display (output) data and receive touch signals (input).

System 300 also includes one or more communications interfaces 316 for communication with a network, such as network 230 of environment 200. Via a communications interface 316 system 300 can communicate data to and receive data from networked devices, which may themselves be other computer processing systems.

System 300 may be any suitable computer processing system, for example, a server computer system, a desktop computer, a laptop computer, a netbook computer, a tablet computing device, a mobile/smart phone, a personal digital assistant, or an alternative computer processing system.

System 300 stores or has access to computer applications (also referred to as software or programs)—i.e., computer readable instructions and data which, when executed by the processing unit 302, configure system 300 to receive, process, and output data. Instructions and data can be stored on non-transitory computer readable media accessible to system 300. For example, instructions and data may be stored on non-transitory memory 310. Instructions and data may be transmitted to/received by system 300 via a data signal in a transmission channel enabled (for example) by a wired or wireless network connection over interface such as 312.

Applications accessible to system 300 will typically include an operating system application such as Microsoft Windows™, Apple macOS™, Apple iOS™, Android™, Unix™ or Linux™.

System 300 also stores or has access to applications which, when executed by the processing unit 302, configure system 300 to perform various computer-implemented processing operations described herein. For example, and referring to networked environment 200 of FIG. 1 above, client system 210 includes a client application 212 which configures the client system 210 to perform client system operations, and product platform 220 includes server application 223 which configures the server environment computer processing system(s) to perform the described server environment operations.

In some cases part or all of a given computer-implemented method will be performed by a single computer processing system 300, while in other cases processing may be performed by multiple computer processing systems in data communication with each other.

Example Methods

Figure 4:
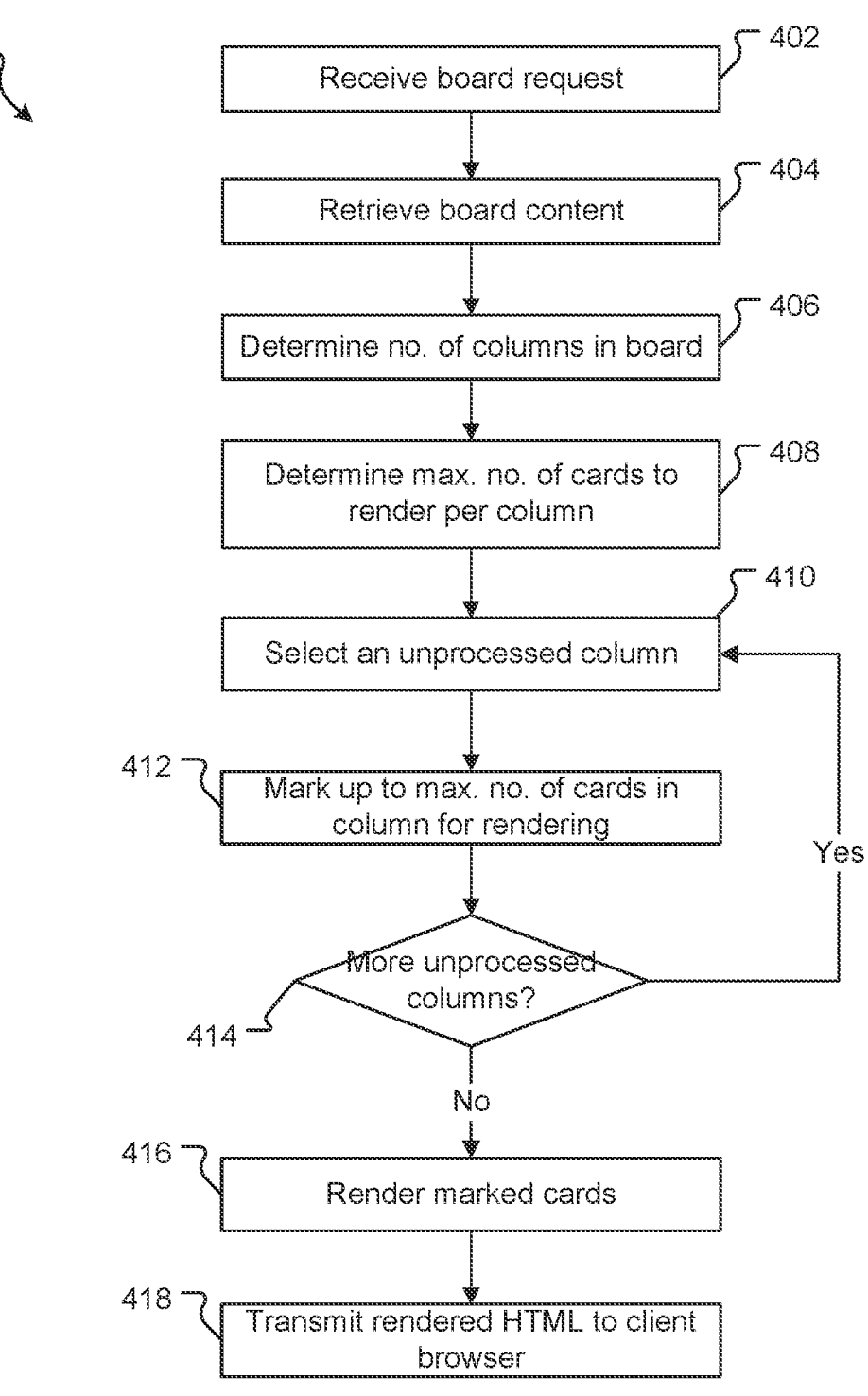
FIG. 4 is a flowchart illustrating a method for responding to a board web page request according to some embodiments of the present disclosure.

FIG. 4 illustrates an example method 400 for responding to a webpage request from a client device. Method 400 describes a process for rendering a board webpage 100 that includes multiple cards 110 arranged in multiple columns.

The method 400 commences at step 402, where the query handler 224 receives a web page request from a client system 210. In some cases, a user may enter a web page URL in a search bar of the web browser or select a particular web page from list of search results. In other cases, the browser may automatically generate and send the web page request, for example, when a user logs into an application hosted by the product platform 220 via a login page. In any event, the web page request includes a URL or any other identifier of the web page. For instance, the web page request may be a request as follows to retrieve a board 100 from an object tracking application—

HTTP GET
www.jira.com/boardview

In addition to the URL, the web page request may include some information about the client application 112 making the request (e.g., a client application identifier). If the user is logged into the application, the web page request may also include a user identifier of the user and in some cases the tenant identifier of the corresponding tenant (for example, if the product application is a multi-tenanted application).

Next, the query handler 224 transforms the incoming HTTP request to an HTTP POST request that is transmitted to the SSR engine 225 and in particular to the marker module 226 of the SSR engine 225.

At step 404, the marker module 226 receives the request for the board 100 and retrieves content for the board 100. Content to be fetched can be specified in the route configuration. In some cases, the fetched data can be board critical data that includes the data needed to render the board such as cards, card content, column names, assignees/users, swimlane configuration, etc. In some examples, the server application 223 may store board content (e.g., HTML, CSS, and board column and card data) in a cache for quick retrieval. In other cases, board content such as cards, card content, assignee/users, etc., may be stored in the database 222 and the marker module 226 may retrieve the web page content from the database 222 (e.g., based on an identifier of the requested board). The HTML and CSS portion of the board content may be communicated to the query handler 224 for communicating to the user device first.

The marker module 226 then parses the board content to determine the number of columns in the board (at step 406). In one example, column data may be provided as part of the board content at step 404.

At step 408, the marker module 226 determines the maximum number of cards 110 to be rendered per column. In one example, this determination is made by dividing the threshold number of cards by the total number of columns. For example, if the threshold number of cards is fifty and the total number of columns is seven, the maximum number of cards that can be rendered per column is seven. It will be appreciated that this number may vary depending on the threshold number. Further, if the threshold number is dynamic (depending on the screen size of the user device), the maximum number may change for the same board on different user devices. For example, for smaller screens, the threshold number may be smaller and therefore the maximum number of cards to be rendered per column may be lower and for larger screens the threshold number may be higher than fifty and therefore the maximum number of cards to be rendered per column may be higher. However, it will be appreciated that the upper limit for the threshold number is set by the timeout of the SSR engine 225.

Once the maximum number of cards that can be rendered by the server per column is determined, the method proceeds to step 410, where the SSR engine selects an unrendered column. In the present embodiment, the marker module 226 processes columns in the order in which they appear in the board 100. Initially, therefore, the marker module 226 selects the first column it identifies in the board 100. However, each following time the method returns to step 408, the next column in the order of appearance is selected.

At step 412, the marker module identifies cards in the selected column to be rendered by the server. In one example, this is done by marking up to the maximum number of cards that can be rendered per column for rendering for the selected column. If the number of cards in the column exceeds the maximum number that can be rendered then the number of cards from the top of the board that match the maximum number are marked for rendering and the remaining cards are not marked. For example, if the column has twenty cards and the max number of cards that can be rendered is determined to be 7 at step 408, then 7 cards are marked for rendering. Alternatively, if the number of cards in the column is fewer than the maximum number of cards that can be rendered then all the cards in the column are marked for rendering at this step. For example, if the column has three cards and the max number of cards that can be rendered is determined to be seven at step 408, then three cards are marked for rendering.

Next, at step 414, the marker module 226 determines whether any more columns need to be processed. If more columns need to be processed, the method reverts to step 410. Otherwise, the method proceeds to step 416, where identifiers of all the cards that are marked for rendering at step 412 are communicated to the render module 228. The render module 228 renders the cards using standard server-side rendering techniques and converts the rendered cards into HTML. In one example, rendering the card includes retrieving script code associated with the card, interpreting or running the script code and converting the script code into static HTML.

The SSR engine 225 then communicates the HTML for the rendered cards to the query handler 224 (at step 418) which communicates this HTML to the client browser for display on the user device. Once the client application 212 receives and displays this content, it may execute the JAVASCRIPT code for the remaining unrendered cards and render them. Once all cards are rendered at the client device, the webpage becomes interactive.

Figure 5:
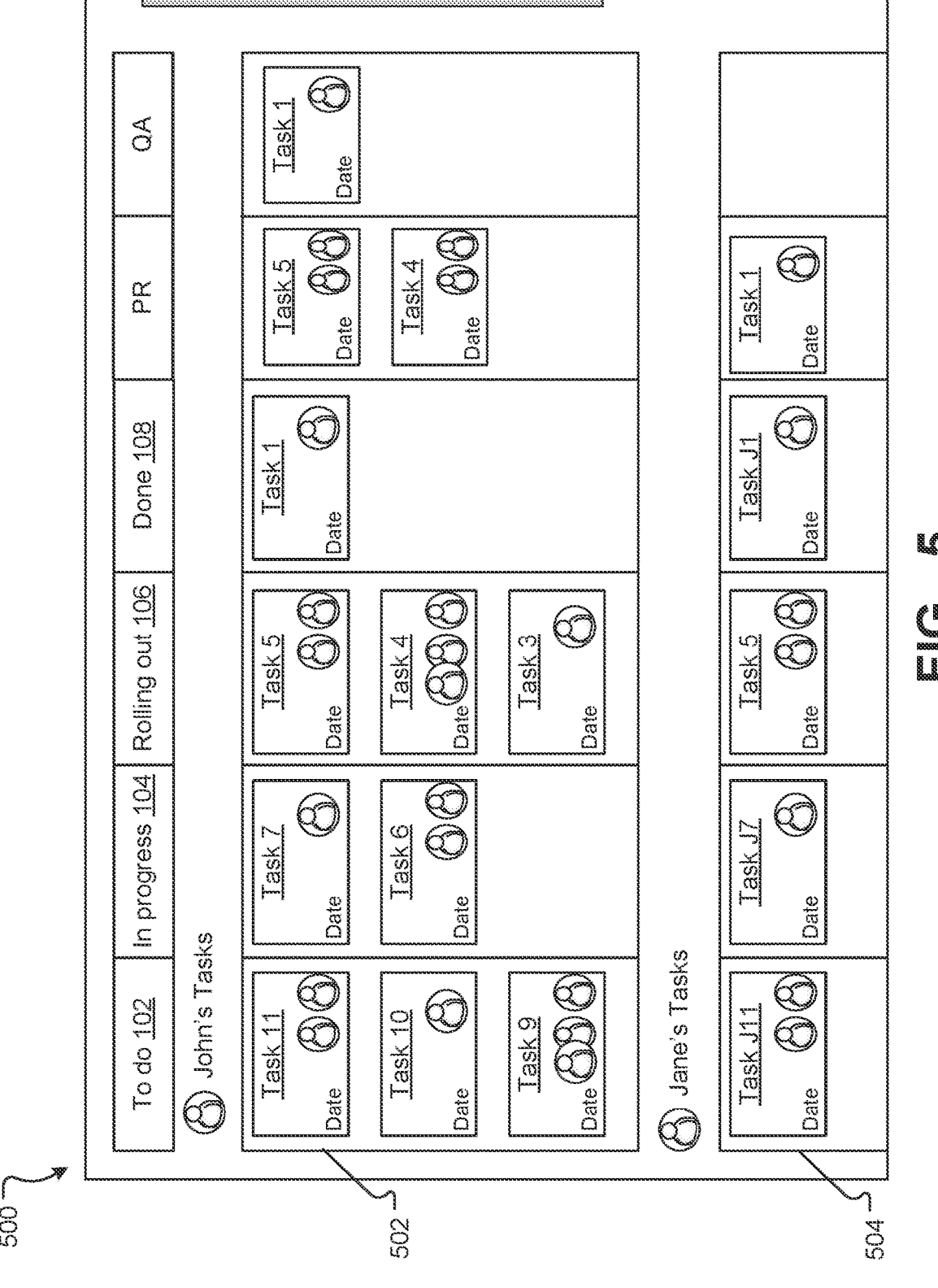
FIG. 5 is another example webpage board rendered by a client system.

In some cases, boards may also include swim lanes. FIG. 5 illustrates one such example board 500. A swimlane is a horizontal categorization of objects/items/tasks in a board. Swimlanes can be used to help distinguish tasks of different categories, such as workstreams, users, application areas, etc. Board 500 includes two swimlanes 502 and 504. Swimlane 502 shows John's tasks across 6 different columns and Swimlane 504 shows Jane's tasks across the same 6 different columns.

In case boards include swimlanes, the card rendering process may be slightly different than process 400 described above. In particular, the marker module 226 may determine the maximum number of cards to render per column for each swimlane until the threshold number is reached. Any swimlanes that fall outside this are rendered by the client.

Figure 6:
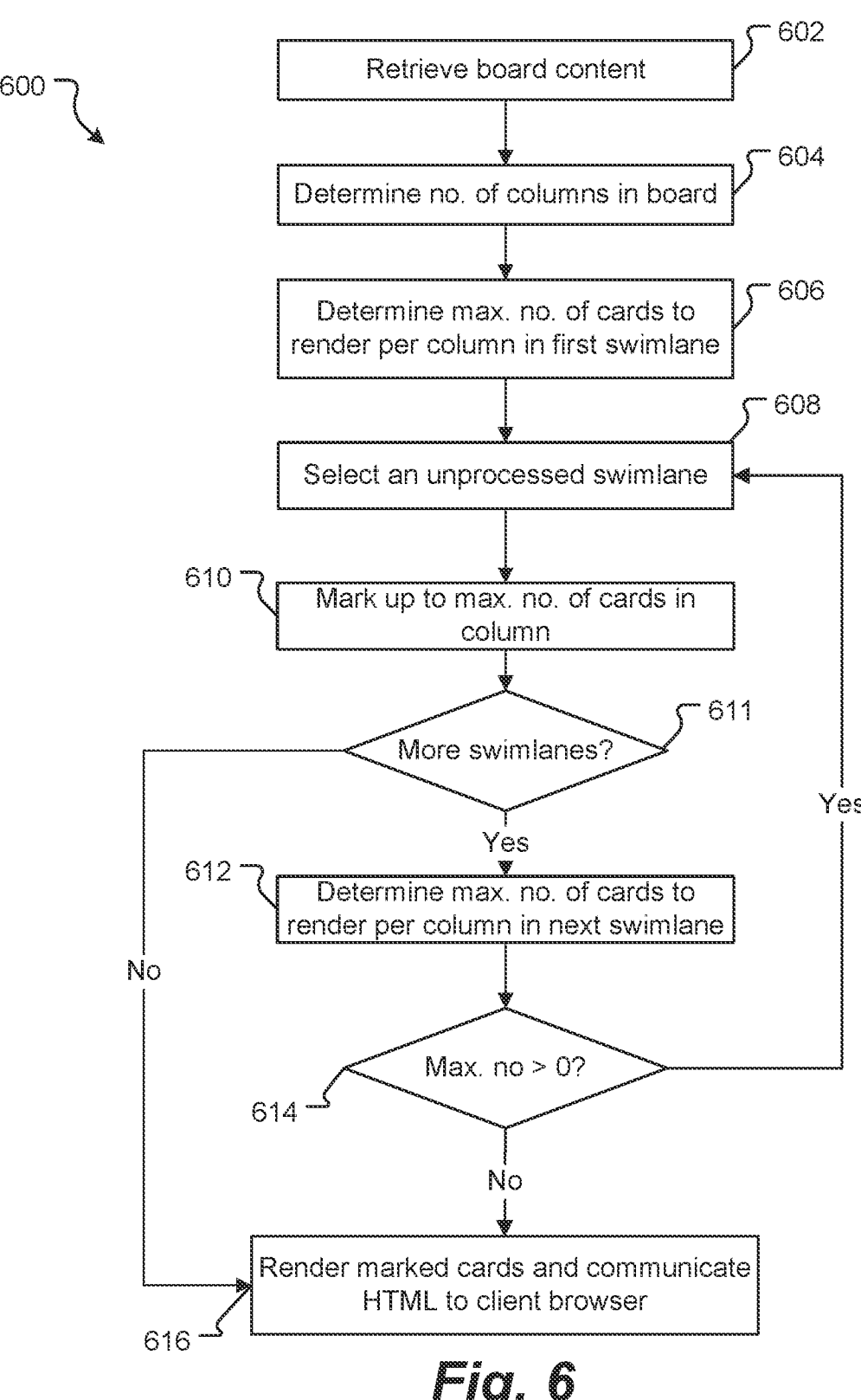
FIG. 6 is a flowchart illustrating a method for responding to a board web page request according to some embodiments of the present disclosure.

FIG. 6 is a flowchart illustrating an example method 600 performed by the SSR engine upon receiving a request to render a board that includes swimlanes (e.g., board 500).

The method 600 commences at step 602, where the SSR engine 225 and in particular the marker module 226 receives the request for the board 500 and retrieves content for the board 500. In some examples, the server application 223 may store board content (e.g., HTML, CSS, and board swimlane, column and card data) in a cache for quick retrieval. In other cases, board content may be stored in the database 222 and the marker module 226 may retrieve the web page content from the database 222 (e.g., based on an identifier of the requested board). The HTML and CSS portion of the board content may be communicated to the query handler 224 for communicating to the user device first.

The marker module 226 then parses the board content to determine the number of columns in the board (at step 604). In one example, column data may be provided as part of board content at step 602.

At step 606, the marker module 226 determines the maximum number of cards 110 that can be rendered per column. In one example, this determination is made by dividing the threshold number of cards by the total number of columns. For example, if the threshold number of cards is fifty and the total number of columns is six, the maximum number of cards that can be rendered per column is eight.

At step 608, the marker module 226 selects a swimlane from the board data. In one example, the swimlane that appears first in the rendered board is selected first. In some embodiments, the order of the swimlanes may be dependent on the user viewing the board. For example, if the swimlanes are user-based (as shown in board 500), the first swimlane displayed on the client system 210 is the one belonging to the user that has made a request to view the board. The remaining swimlanes may be arranged based on alphabetical order. If the board 500 does not have any swimlanes corresponding to the user that has made the request to view the board, the swimlanes may be displayed in alphabetical order. Alternatively or additionally, if the swimlanes are not user-based, they can be displayed in alphabetical order based on the name of the swimlane. Accordingly, at step 608, the marker module 226 determines the display order of the swimlanes and then selects the swimlane that is supposed to be displayed first in the rendered board 500.

At step 610, the marker module 226 identifies cards for rendering in the selected swimlane. In one example this is done by marking for rendering up to the maximum number of cards that can be rendered in a column. In particular, the marker module 226 determines the highest number of cards present in any given column of the swimlane. For example, the marker module 226 may order the columns based on number of cards per column and determine the highest number of cards in any given column. In the example of the board 500, the marker module 226 may determine that the highest number of cards in any column of swimlane 502 is three.

If the highest number of cards in any given column of the swimlane is lower than the maximum number of cards that can be rendered per column, the marker module 226 marks all the cards in the selected swimlane for rendering. For example, if the highest number of cards in any column of the swimlane is three cards and the max number of cards that can be rendered per column is determined to be seven, then up to three cards are marked for rendering in each column of the swimlane. Alternatively or additionally, if the maximum number of cards in any given column of the swimlane is higher than the maximum number of cards that can be rendered per column, the marker module 226 marks up to the maximum number of cards that can be rendered in the columns of the swimlane for rendering. For example, if one of the columns of the swimlane has twenty cards and the max number of cards that can be rendered per column is determined to be seven, then up to seven cards are marked for rendering in the columns of the swimlane.

At step 611, the marker module 226 determines whether any other swimlanes exist in the board 500. If more swimlanes exist, the method proceeds to step 612 where the marker module 226 determines the maximum number of cards that can be marked for rendering per column in the next swimlane. In some embodiments, this number is determined by subtracting the highest number of cards marked for rendering in any column of the previous swimlane from the maximum number of cards that could be rendered per column. For example, if the maximum number of cards that could be rendered per column was eight and the highest number of cards marked for rendering in any column of the previous swimlane was eight, the maximum number of cards that can be rendered per column in the next swimlane is 0. In another example, if the maximum number of cards that could be rendered per column was eight and the highest number of cards marked for rendering in any column of the previous swimlane was three, the maximum number of cards that can be rendered per column in the next swimlane is four.

At step 614 a determination is made whether the max number of cards that can be rendered per column in the next swimlane is greater than zero. If this number is greater than zero, the method reverts to step 608 where the next unrendered swimlane is selected. Alternatively, if at step 614 it is determined that the max number of cards that can be rendered in the next swimlane is zero, the method proceeds to step 616 where the identifiers of the cards marked for SSR rendering is communicated to the render module 228. The render module 228 retrieves JAVASCRIPT code based on the card identifiers received at step 616 and renders the cards using standard server-side rendering techniques and converts the rendered cards into HTML.

The SSR engine 225 then communicates the HTML for the rendered cards to the query handler 224 which communicates this HTML to the client browser for display on the user device.

Once the client application 212 receives and renders this content, it may execute the JAVASCRIPT code for the remaining unrendered cards and render them. Once all cards are rendered at the client system 210, the webpage becomes interactive.

Returning to step 611, if at this step the marker module 226 determines that there are no other swimlanes to process, the method 600 directly proceeds to step 616 described above.

In method 400 and 600 described above, a maximum number of cards that can be rendered per column is determined based on the number of columns and the threshold number. Then, the SSR engine 225 marks up to that maximum number of cards in each column for rendering and the render module 228 renders the marked cards. Although this is a simply process, it may not be ideal in all cases. For example, consider the situation where a board includes seven columns, but only the first two columns include any cards. The remaining columns are empty. In such cases, because the maximum number of cards per column is predetermined, the SSR engine can only render at maximum 14 cards. In such cases, the speed of SSR rendering may not be fully utilized. Further still, in such cases if the first column had thirty cards and the second column had fifteen cards, such that the total number of cards in the board is below the threshold number, the SSR engine 225 could have rendered the entire board thereby saving any additional rendering at the client device.

To take such situations into account, the SSR engine 225 may adopt a different approach for rendering cards in the board. This approach is described with respect to FIG. 7.

Figure 7:
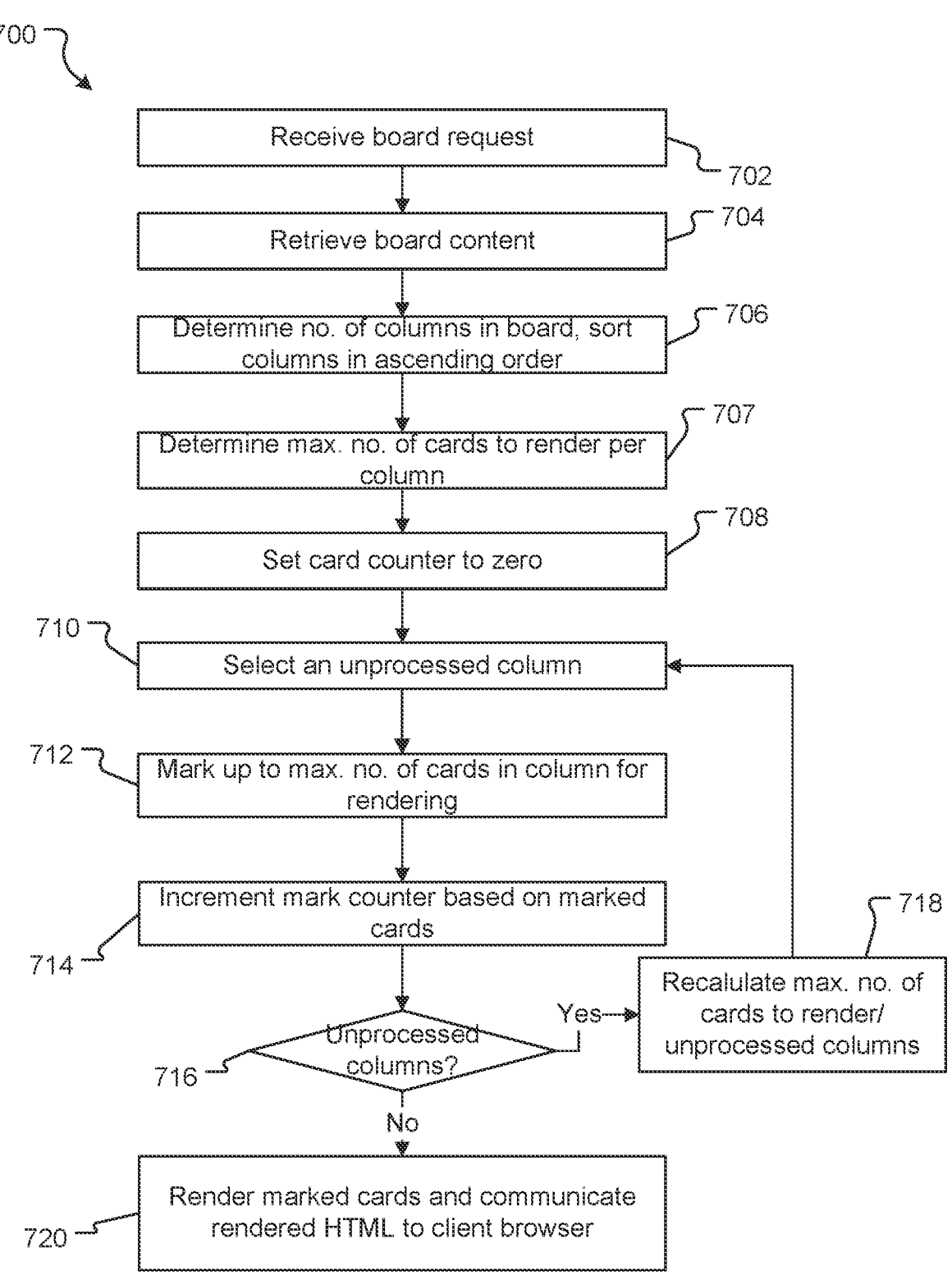
FIG. 7 is a flowchart illustrating another method for responding to a board webpage request according to some embodiments of the present disclosure.

In particular, FIG. 7 illustrates another example method 700 for responding to a webpage request from a client device. Method 700 describes a process for rendering a board webpage 100 that includes multiple cards 110 arranged in multiple columns (either with swimlanes or without).

The method 700 commences at step 702, where the query handler 224 receives a web page request from a client system 210. This step is similar to step 402 of method 400 and is therefore not described in detail here.

Next, the query handler 224 transforms the incoming web page request to an HTTP POST request that is transmitted to the SSR engine 225 and in particular to the marker module 226.

At step 704, the marker module 226 receives the request for the board 100 and retrieves content for the board 100. This step is similar to step 404 and there is also not described in detail here.

The marker module 226 then parses the board content to determine the number of columns in the board (at step 706). It also sorts the columns in ascending order based on the number of cards present in each column. For instance, if the board includes four columns, A-D with 10, 16, 3, and 12 cards, respectively, the SSR engine 225 sorts the columns in the order C, A, D, B.

At step 707, the marker module 226 determines the maximum number of cards 110 to be rendered per column. In one example, this determination is made by dividing the threshold number of cards by the total number of columns. For example, if the threshold number of cards is fifty and the total number of columns is seven, the maximum number of cards that can be rendered per column is seven.

At step 708, the marker module 226 sets a card counter (also interchangeably referred to as a component counter herein) at zero. The card counter is incremented each time the marker module 226 marks a card for SSR rendering.

At step 710 the marker module 226 selects a column of the board to be processed. In the present embodiment, the marker module 226 processes the columns in the determined ascending sort order. Initially, therefore, the marker module 226 selects the first column (that has the least number of cards) in the board 100. However, each following time the method returns to step 710, the next column in the ascending sort is selected for processing. Once the last column has been selected, the method ends.

At 712, up to the current maximum number of cards that can be rendered per column are marked for rendering for the selected column. If the number of cards in the column exceeds the maximum number that can be rendered then the number of cards from the top of the board that match the maximum number are marked for rendering and the remaining cards are not marked. For example, if the column has twenty cards and the max number of cards that can be rendered per column is determined to be seven at step 706, then seven cards are marked for rendering. Alternatively or additionally, if the number of cards in the column is fewer than the maximum number of cards that can be rendered then all the cards in the column are marked for rendering at this step. For example, if the column has three cards and the max number of cards that can be rendered is determined to be seven at step 706, then three cards are marked for rendering.

Once the cards are marked, the method proceeds to step 714 where the SSR engine 225 increments the card marking counter value by the number of cards that were marked for rendering in step 712.

Next, at step 716, the marker module 226 determines whether any more columns need to be processed. If more columns need to be processed, the method proceeds to step 718.

At step 718, the marker module 226 recalculates the maximum number of cards 110 to be rendered per remaining columns. In one example, this determination is made by subtracting the counter value from the threshold number of cards and then dividing that the number of unprocessed columns. For example, if the threshold number of cards was fifty and the card marking counter value is six, the new threshold number becomes 44 and this is divided by the number of unprocessed columns (e.g., 6), to determine the current maximum number of cards that can be rendered per column as eight.

Once the maximum number of cards to be rendered per remaining columns is recalculated, the method reverts to step 710 and the process repeats until no further unprocessed columns remain.

Returning to step 716, if at this step it is determined that no further columns remain for processing, the method proceeds to step 720, where identifiers of the cards that are marked for rendering at step 712 are communicated to the render module 228. The render module 228 renders the cards using standard server-side rendering techniques and converts the rendered cards into HTML. In one example, rendering the card includes retrieving script code associated with the card, interpreting or running the script code and converting the script code into static HTML.

Accordingly, by using method 700 the SSR engine 225 can mark the maximum number of board cards 110 within the threshold before passing the responsibility to the client browser to render the rest.

As the HTML body is streamed to the client browser, the SSR engine 128 can communicate the HTML and CSS first and then start communicating the converted HTML as soon as the corresponding server components are executed and doesn't have to wait until all the server components are executed. This way, the client browser can start generating the DOM, CSSOM and render trees as soon as the client starts receiving the HTML body.

Figure 8:
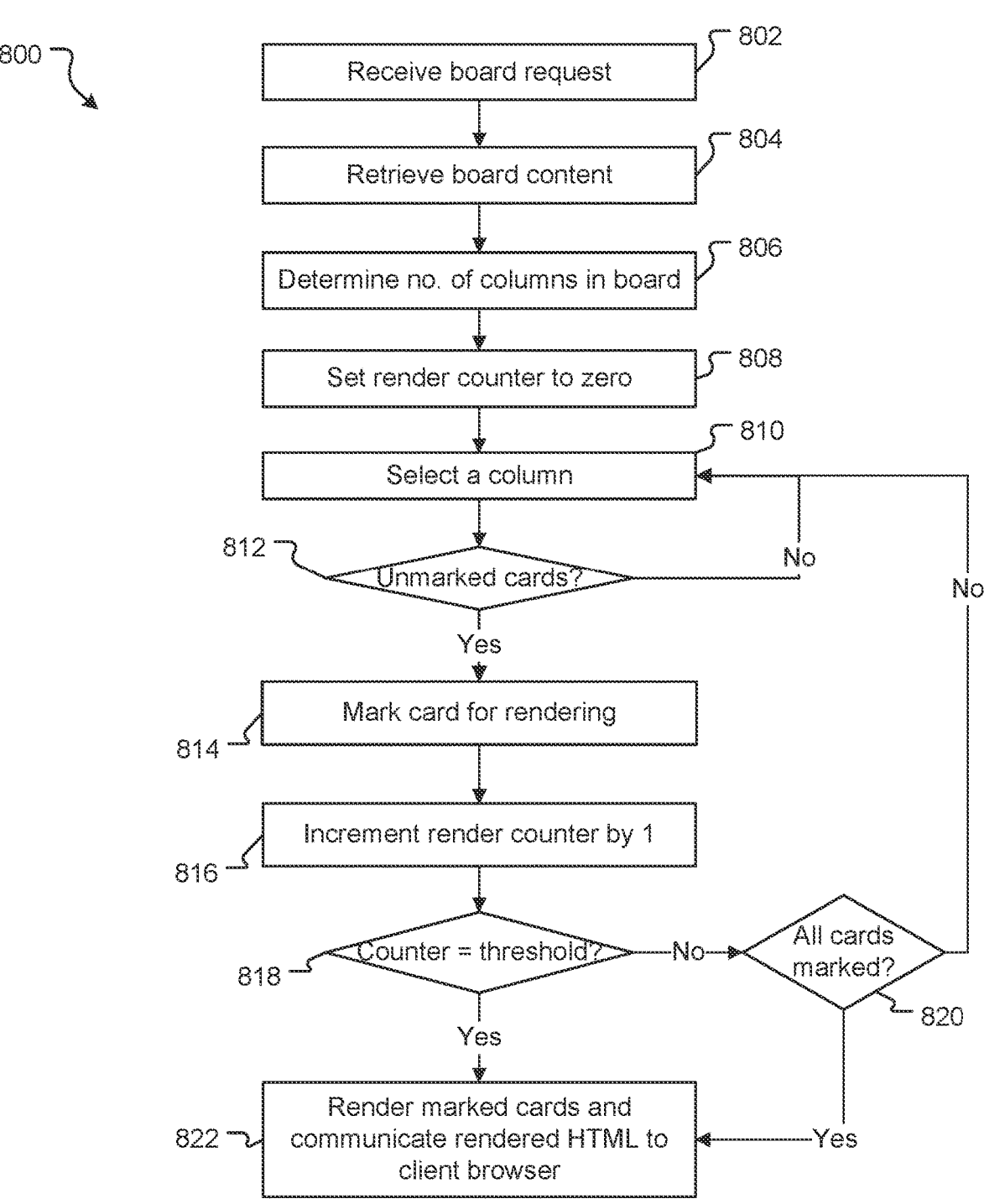
FIG. 8 is a flowchart illustrating yet another method for responding to a board webpage request according to some embodiments of the present disclosure.

FIG. 8 is a flowchart illustrating an alternate method 800 for responding to a webpage request from a client device. Method 800 describes a process for rendering a board webpage 100 or 500 that includes multiple cards 110 arranged in multiple columns (either with swimlanes or without).

The method 800 commences at step 802, where the query handler 224 receives a web page request from a client system 210. This step is similar to step 402 of method 400 and is therefore not described in detail here.

Next, the query handler 224 transforms the incoming web page request to an HTTP POST request that is transmitted to the SSR engine 225 and in particular the marker module 226.

At step 804, the marker module 226 receives the request for the board 100 and retrieves content for the board 100.

The marker module 226 then parses the board content to determine the number of columns in the board (at step 806).

At step 808, the marker module 226 sets a render counter at zero. The render counter is incremented each time the marker module 226 renders a card.

At step 810 the marker module 226 selects a column of the board to be processed. In the present embodiment, the marker module 226 processes columns in the order in which they appear in the board 100. Initially, therefore, the marker module 226 selects the first column it identifies in the board 100. However, each following time the method returns to step 810, the next column in the order of appearance is selected. Once the last column has been selected, the cycle repeats and the first column from the set of columns is selected.

At 812, the marker module 226 determines whether an unmarked card (i.e., a card that has not yet been marked for rendering) exists in the column. If it is determined that an unmarked card exists in column, the method proceeds to step 814 where the next available card in the column is marked for rendering. In one example, the marker module 226 views cards from the top of the board 100 to the bottom. Accordingly, it first checks if the first card from the top in the column is marked for rendering. If this card is not marked for rendering, the marker module 226 proceeds to render this card. Otherwise, if the first card is already marked, it marks the next card in the column for rendering and so on.

Once the card is marked for rendering, the method proceeds to step 816 where the marker module 226 increments the render counter value by one.

Next, at step 818 the marker module 226 determines whether the number of cards marked for rendering by the SSR engine 225 has reached a threshold number of cards that can be rendered by the SSR engine 225. As discussed previously, in some examples, the threshold number may be predetermined based on the average time taken by the SSR engine to render a card and the SSR timeout period. For instance, the threshold number may be preset as fifty cards. In other examples, the threshold number may be determined based on the screen size of the client system 210 or the number of columns in the board.

In any event, at step 818, if it is determined that the number of cards marked for rendering has reached the threshold number (e.g., because the render counter value matches the threshold number value), the marker module 226 communicates the marked card identifiers to the render module 228 that retrieves JAVASCRIPT components for the identified card, executes the script and generated HTML.

The HTML corresponding to the rendered cards is then communicated to the query handler 224 for communicating to the client device.

Alternatively of additionally, if at step 818, it is determined that the number of cards rendered has not reached the threshold number, the method proceeds to step 820 where the marker module 228 determines whether any unmarked cards exist in the board 100, 500. In one example, this may be done by comparing a total number of cards in the board with the rendered count. If the total number of cards matches the rendered count the marker module 226 determines that all the board cards have been marked for rendering and the method 800 ends. Otherwise, if at step 820 it is determined that unrendered cards exist in the board 100, 500, the method 800 returns to step 810 and the method 800 repeats in this cycle until either the number of marked cards matches the threshold number of cards to be rendered or there are no remaining unmarked cards in the board 100, 500.

It will be appreciated that some columns may have fewer cards than other columns. For example, in the board 100 shown in FIG. 1, the TO DO column 102 includes four cards whereas the IN PROGRESS column 104 includes 2 cards. Further, the DONE column 108 includes a single card. Accordingly, in the second cycle of method 800 (e.g., once one card in each column is rendered), when the DONE column 108 is selected, at step 810, the marker module 226 may determine that all available cards in that column are marked. In such cases, at step 812, the marker module 226 determines that no unrendered cards remain in that column and the method reverts to step 810 where the next column (the 'TO DO' column 102 in this example) is selected.

Accordingly, by using method 800 the SSR engine 225 can also render the maximum number of board cards 110 within the threshold before passing the responsibility to the client browser to render the rest.

The flowcharts illustrated in the figures and described above define operations in particular orders to explain various features. In some cases the operations described and illustrated may be able to be performed in a different order to that shown/described, one or more operations may be combined into a single operation, a single operation may be divided into multiple separate operations, and/or the function(s) achieved by one or more of the described/illustrated operations may be achieved by one or more alternative operations. Still further, the functionality/processing of a given flowchart operation could potentially be performed by different systems or applications.

Unless otherwise stated, the terms "include" and "comprise" (and variations thereof such as "including", "includes", "comprising", "comprises", "comprised" and the like) are used inclusively and do not exclude further features, components, integers, steps, or elements.

It will be understood that the embodiments disclosed and defined in this specification extend to alternative combinations of two or more of the individual features mentioned in or evident from the text or drawings. All of these different combinations constitute alternative embodiments of the present disclosure.

The present specification describes various embodiments with reference to numerous specific details that may vary from implementation to implementation. No limitation, element, property, feature, advantage or attribute that is not expressly recited in a claim should be considered as a required or essential feature. Accordingly, the specification and drawings are to be regarded in an illustrative rather than a restrictive sense.

What is claimed is:

1. A method for rendering a webpage, the method comprising:

receiving a request to render a graphical user interface on a client application operating on a client device, the graphical user interface comprising a first plurality of cards comprising a first number of cards arranged into respective columns; and identifying:

in accordance with the first number of cards being less than or equal to a number of cards estimated to be renderable by a server within a predetermined time period, a first set of cards comprising the first plurality of cards; and in accordance with the first number of cards being greater than the number of cards estimated to be renderable by the server within the predetermined time period:

a second set of cards comprising a second number of cards of the first plurality of cards, the second number of cards equal to the number of cards estimated to be renderable by the server within the predetermined time period;

a third set of cards different from the second set of cards and comprising a third number of cards of the first plurality of cards, the third number of cards equal to a difference between the first number of cards and the second number of cards; and subsequent to identifying, rendering, at the server, first content associated with a respective one of the first set of cards and the second set of cards to produce server-rendered content;

transmitting the server-rendered content to the client device;

in response to receiving, at the client device, the server-rendered content:

in accordance with the first number of cards being less than or equal to the number of cards estimated to be renderable by the server within the predetermined time period, causing display of the server-rendered content on the client device; and in accordance with the first number of cards being greater than the number of cards estimated to be renderable by the server within the predetermined time period:

causing second content associated with the third set of cards to be rendered at the client device to produce client device-rendered content; and causing display of the server-rendered content and the client device-rendered content on the client device.

2. The method of claim 1, wherein the client application is a virtual board and further comprising:

identifying a number of columns of the virtual board;

identifying a maximum number of cards to render per column based on a threshold number of webpage components that can be rendered by the server in the predetermined time period; and marking up to the maximum number of cards per column to be rendered by the server.

3. The method of claim 1, further comprising:

identifying a screen size of the client device; and determining, based on the screen size, a maximum number of cards to be rendered by the server.

4. The method of claim 1, wherein the first content associated with the respective one of the first set of cards and the second set of cards rendered by the server is selected based on cards displayed at a top portion of the graphical user interface of the client application.

5. The method of claim 1, wherein the client application is a virtual board, the virtual board includes a plurality of swimlanes, each swimlane comprising a plurality of columns, and wherein identifying the respective one of the first set of cards and the second set of cards further comprises:

determining a number of columns in the virtual board;

determining a maximum number of cards to render per column based on a threshold number of cards that can be rendered by the server and the number of columns in the virtual board;

marking up to the maximum number of cards per column to be rendered for a first swimlane;

recomputing maximum number of cards to render per column in remaining swimlanes; and repeating the marking and the recomputing until the recomputed maximum number of cards to render per column is zero.

6. The method of claim 1, wherein the predetermined time period is based on a timeout within which the server should render the respective one of the first set of cards and the second set of cards.

7. The method of claim 1, further comprising:

converting the first content associated with the respective one of the first set of cards and the second set of cards rendered at the server to Hyper Text Markup Language (HTML); and communicating the HTML of the first content associated with the respective one of the first set of cards and the second set of cards to the client device.

8. A method for rendering a webpage, the method comprising:

receiving a request to render the webpage from a client device, the webpage comprising a first plurality of webpage components comprising a first number of webpage components; and calculating:

in accordance with the first number of webpage components being less than or equal to a threshold number of webpage components estimated to be renderable by a server based on a screen size of the client device, a first set of webpage components comprising the first plurality of webpage components; and in accordance with the first number of webpage components being greater than the threshold number of webpage components estimated to be renderable by the server:

a second set of webpage components comprising a second number of webpage components of the first plurality of webpage components, the second number of webpage components equal to the threshold number of webpage components estimated to be renderable; a third set of webpage components different from the second set of webpage components and comprising a third number of webpage components of the first plurality of webpage components, the third number of webpage components equal to a difference between the first number of webpage components and the second number of webpage components; and subsequent to calculating, rendering, by the server, a respective one of the first set of webpage components and the second set of webpage components to produce server-rendered content, the rendered respective one of the first set of webpage components and the second set of webpage components selected from the first plurality of webpage components;

transmitting the server-rendered content to the client device;

in response to receiving, at the client device, the server-rendered content:

in accordance with the first number of webpage components being less than or equal to the threshold number of webpage components estimated to be renderable by the server, causing display of the server-rendered content on the client device; and in accordance with the first number of webpage components being greater than the threshold number of webpage components estimated to be renderable by the server:

transmitting a set of unrendered webpage components of the first plurality of webpage components to the client device; and causing display of the server-rendered content on the client device.

9. The method of claim 8, wherein the webpage is a virtual board comprising a plurality of columns and further comprising:

determining a number of columns in the virtual board;

determining a maximum number of webpage components to render per column based on the threshold number of webpage components that can be rendered by the server; and marking the maximum number of webpage components per column to be rendered by the server.

10. The method of claim 9, wherein the maximum number of webpage components that can be rendered by the server is further based on a preconfigured time and the number of columns in the virtual board.

11. The method of claim 8, wherein the webpage is a board comprising a plurality of columns and further comprising:

determining a number of columns in the board;

setting a component counter to zero;

selecting a first column of the board;

determining whether the selected first column includes a first unmarked webpage component;

upon determining that the selected first column includes the first unmarked webpage component, marking the first unmarked webpage component from the first selected column for rendering at the server;

incrementing the component counter;

determining whether a value of the component counter matches a threshold number;

based on the determining that the value of the component counter is lower than the threshold number:

selecting an other column of the board;

determining whether the other selected column includes a second unmarked webpage component;

based on determining that the other selected column includes the second unmarked webpage component, marking the second unmarked webpage component from the other selected column for rendering at the server;

incrementing the component counter; and determining whether the value of the component counter matches the threshold number.

12. The method of claim 8, wherein:

calculating the threshold number of webpage components is further based on an initial number of webpage components initially visible on the client device;

the method further comprises rendering, by the server, the initial number of webpage components; and unrendered webpage components correspond to webpage components that become visible after a scrolling action by a user of the client device.

13. The method of claim 8, wherein the webpage corresponds to an issue tracking system comprising work items having a respective state including:

to do;

in progress;

code review; or done.

14. The method of claim 8, further comprising:

converting the rendered respective one of the first set of webpage components and the second set of webpage components rendered at the server to Hyper Text Markup Language (HTML); and communicating the HTML of the rendered respective one of the first set of webpage components and the second set of webpage components to the client device.

15. A method for partially rendering a webpage by a server, the method comprising:

receiving a request to render a graphical user interface of a virtual board on a client application operating on a client device, the graphical user interface comprising a first plurality of webpage components comprising a first number of webpage components; and identifying:

in accordance with the first number of webpage components being less than or equal to a number of webpage components estimated to be renderable by the server based at least in part on an estimated number of webpage components to be initially displayed on the client device, a first group of webpage components comprising the first plurality of webpage components; and in accordance with the first number of webpage components being greater than the number of webpage components estimated to be renderable by the server based at least in part on the estimated number of webpage components to be initially displayed on the client device:

a second group of webpage components comprising a second number of webpage components of the first plurality of webpage components, the second number of webpage components equal to the estimated number of webpage components;

a third group of webpage components different from the second group of webpage components and comprising a third number of webpage components of the first plurality of webpage components, the third number of webpage components equal to a difference between the first number of webpage components and the second number of webpage components; and subsequent to identifying, rendering, by the server, a respective one of the first group of webpage components and the second group of webpage components to produce server-rendered content;

transmitting, by the server the server-rendered content to the client device; and in response to receiving, at the client device, the server-rendered content:

in accordance with the first number of webpage components being less than or equal to the number of webpage components estimated to be renderable by the server based at least in part on the estimated number of webpage components to be initially displayed on the client device, causing display of the server-rendered content on the client device; and in accordance with the first number of webpage components being greater than the number of webpage components estimated to be renderable by the server based at least in part on the estimated number of webpage components to be initially displayed on the client device:

transmitting, by the server, the third group of webpage components to the client device, the third group of webpage components unrendered by the server; and causing display, on the client device, of the server-rendered content and the third group of webpage components rendered by the client device.

16. The method of claim 15, further comprising:

identifying a screen size of the client device; and estimating the number of webpage components to be initially displayed on the client device based on the identified screen size of the client device.

17. The method of claim 15, wherein the virtual board comprises a plurality of columns and the first plurality of webpage components are arranged in the plurality of columns.

18. The method of claim 17, further comprising:

determining a number of columns in the virtual board;

determining a maximum number of webpage components to render per column based on a threshold number of webpage components that can be rendered by the server in a preconfigured time and the number of columns in the virtual board; and marking up to the maximum number of webpage components per column to be rendered by the server.

19. The method of claim 15, wherein:

identifying the first group of webpage components comprises selecting the first group of webpage components from the first plurality of webpage components based on webpage components to be displayed in a top portion of the webpage.

20. The method of claim 15, further comprising:

determining a threshold number of webpage components that can be rendered by the server prior to a server timeout; and identifying up to the threshold number of webpage components as the first group of webpage components.

* * * * *